United States Patent
Cariello et al.

(10) Patent No.: US 11,941,268 B2
(45) Date of Patent: Mar. 26, 2024

(54) SYSTEM USING A RESTRICTED OPERATION MODE MEMORY INDICATOR

(71) Applicant: Micron Technology, Inc., Boise, ID (US)

(72) Inventors: Giuseppe Cariello, Boise, ID (US); Jonathan Scott Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 17/666,258

(22) Filed: Feb. 7, 2022

(65) Prior Publication Data

US 2022/0155983 A1    May 19, 2022

Related U.S. Application Data

(63) Continuation of application No. 16/419,685, filed on May 22, 2019, now Pat. No. 11,243,699.

(51) Int. Cl.
*G06F 3/06* (2006.01)

(52) U.S. Cl.
CPC .......... *G06F 3/0634* (2013.01); *G06F 3/0604* (2013.01); *G06F 3/0653* (2013.01); *G06F 3/0659* (2013.01); *G06F 3/0679* (2013.01)

(58) Field of Classification Search
CPC .... G06F 3/0634; G06F 3/0604; G06F 3/0653; G06F 3/0659; G06F 3/0679; G06F 12/0246
See application file for complete search history.

(56) References Cited

U.S. PATENT DOCUMENTS

| | | | |
|---|---|---|---|
| 8,094,500 B2 | 1/2012 | Paley et al. | |
| 8,244,960 B2 | 8/2012 | Paley et al. | |
| 9,201,717 B2* | 12/2015 | Yano | G06F 11/073 |
| 10,496,307 B1 | 12/2019 | Peros et al. | |
| 11,243,699 B2 | 2/2022 | Cariello et al. | |
| 2007/0180328 A1 | 8/2007 | Cornwell et al. | |
| 2010/0070727 A1 | 3/2010 | Harris et al. | |
| 2010/0174846 A1 | 7/2010 | Paley et al. | |
| 2011/0040924 A1 | 2/2011 | Selinger | |
| 2011/0041005 A1 | 2/2011 | Selinger | |
| 2011/0041039 A1 | 2/2011 | Harari et al. | |
| 2015/0350206 A1 | 12/2015 | Shin et al. | |

(Continued)

FOREIGN PATENT DOCUMENTS

| | | |
|---|---|---|
| CN | 101040450 A | 9/2007 |
| CN | 111984546 | 11/2020 |

(Continued)

OTHER PUBLICATIONS

"Chinese Application Serial No. 202010442614.0, Office Action dated Sep. 11, 2023", w/o English Translation, 10 pgs.

(Continued)

*Primary Examiner* — Jae U Yu
(74) *Attorney, Agent, or Firm* — Schwegman Lundberg & Woessner, P.A.

(57) ABSTRACT

Systems and methods are disclosed comprising receiving a request for a descriptor of a storage system, sending the descriptor to the host including an indication that a component of the storage device is in a restricted operation mode, wherein the host device utilizes the indication to determine a boot mode of the host device.

20 Claims, 5 Drawing Sheets

(56) References Cited

U.S. PATENT DOCUMENTS

2017/0364275 A1 12/2017 Natarajan et al.
2018/0357018 A1 12/2018 Karr et al.
2020/0371702 A1 11/2020 Cariello et al.

FOREIGN PATENT DOCUMENTS

EP    2519879 B1   10/2013
EP    2374063 B1   11/2017

OTHER PUBLICATIONS

U.S. Appl. No. 16/419,685 U.S. Pat. No. 11,243,699, filed May 22, 2019, System Using a Restricted Operation Mode Memory Indicator.

\* cited by examiner

| DESCRIPTOR | | | | |
|---|---|---|---|---|
| OFF SET | SIZE | NAME | MDV | DESCRIPTION |
| 02h | 1 | bPreEOLInfo | DEVICE SPECIFIC | PRE END OF LIFE INFO<br>0h: NOT DEFINED<br>1h: NORMAL<br>2h: WARNING (80%)<br>3h: CRITICAL (90%)<br>4h: EOL REACHED<br>5h: PERM WRITE PROT<br>6h: TEMP WRITE PROT<br>OTHERS: RESERVED |

SYSTEM USING A RESTRICTED OPERATION MODE MEMORY INDICATOR

PRIORITY APPLICATION

This application is a continuation of U.S. application Ser. No. 16/419,685, filed May 22, 2019, which is incorporated herein by reference in its entirety.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems (e.g., hosts) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system (e.g., a solid-state drive (SSD), a universal flash storage (UFS) device, etc.) can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block replacement or retirement, wear leveling), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figures 1, 2:
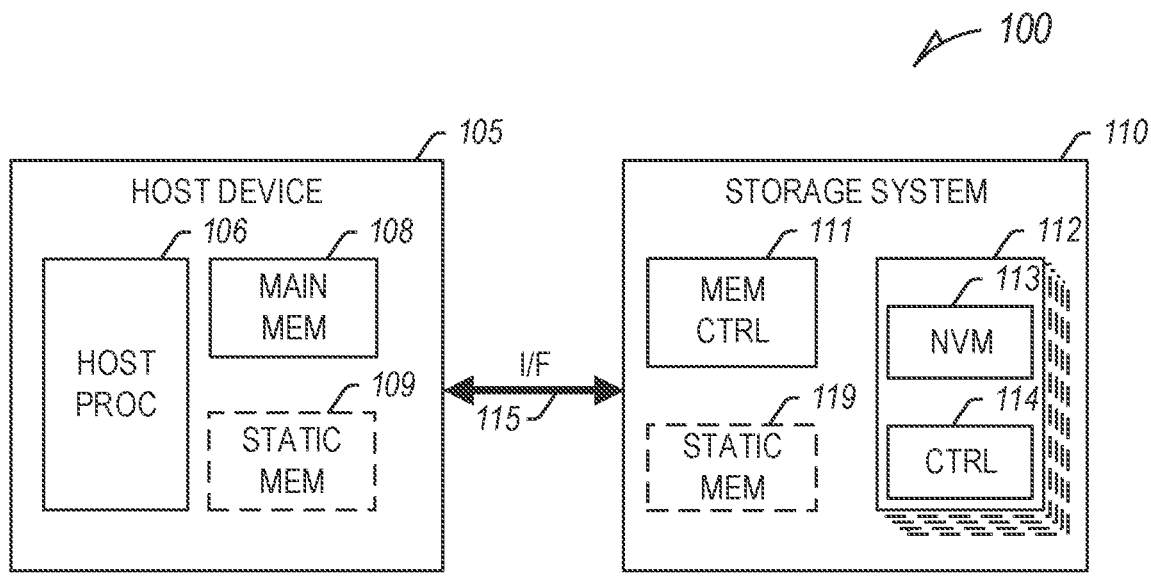
FIG. 1 illustrates an example host system including a host device and a storage system.
FIG. 2 illustrates an example diagram of a proposed descriptor field.

Host systems, or portions of host systems, such as a host device or a storage system, often have multiple operating modes, such as a normal operation mode, and one or more limited operational modes, in which one or more functionalities operable in the normal operation mode are inoperable or modified. For example, one or more variations of such a restricted operation mode may be known as "safe mode." Safe mode can refer to a diagnostic mode of a computing device (e.g., a processor or controller), software, programs, operating systems, etc., o with reduced functionality, allowing only essential system programs and services, such as to troubleshoot and correct issues preventing normal operation. In other examples, one or more limited operational modes can be triggered in storage systems for one or more other reasons, such as if a temperature of the storage system is outside an operating range; if a write, erase, or read count is exceeded; if a threshold number of blocks have failed or been replaced; or if there are not enough resources for the device to perform essential normal-mode operations, such as garbage collection, security operations (e.g., a cellular phone writing network information to the storage device, etc.); etc. Accordingly, if one or more normal-mode operations cannot be performed, or if one or more other conditions are met or exceeded (e.g., if the free or available blocks fall below a threshold number required for operation, if the number of reserved blocks for bad block replacement have been consumed, etc.), the storage system, or aspects of the storage system, can be placed in restricted operation mode. Such restricted operation modes are modes in which one or more normal operation modalities of the storage system (or a portion thereof) is not available, such as one or more of: read access, write access, programming voltage levels, etc. In many examples, a storage system controller, or a controller associated with an individual memory device or assembly, will recognize a fault or other error condition, and place the storage system, or portion thereof, in the restricted operation mode as a protective measure to prevent damage to the storage system and/or the data therein.

One such mode in a storage system is often a write protect mode, preventing data from being written (e.g., blocks of data) until the issue that triggered the safe mode is resolved, such as to prevent "good" data from being corrupted or destroyed. However, certain host system boot modes require data be written (e.g., blocks of data) for operation (including startup), such that if write protect features, affected devices may become unrecoverable through normal measures (e.g., board-level access may be required to reinstall firmware, etc.).

Storage system operation can be tailored for specific host system operation, and vice versa. However, as a specific storage system can be used in a number of host systems, specific configurations for each combination of host system and storage system can be difficult. Accordingly, it can be advantageous to provide storage system information about the status and operation of the storage system, available to the host system, without significantly impacting host or storage system resources.

The present inventors have recognized, among other things, that a storage system, or aspects of the storage system, can store an indication that the storage system or aspects of the storage system are in a restricted operation mode. In an example, the storage system can define, set, or store one or more bits, flags, or other attributes, such as in a data structure on the storage system to indicate that the system (or aspects of the system, such as one or more of the memory devices, etc.) is in a restricted operation mode, or in a standard operation mode.

In an example, the safe mode can be triggered using a comparison of one or more measures to one or more thresholds. In an example, the threshold number of replacement blocks can be a percentage of the total blocks (e.g., 1%, 2%, 5%, etc.), a number of blocks (e.g., 64, 128, 256, 512, 1024, etc.), or one or more other thresholds configured to ensure data can be removed without adversely impacting system performance. A threshold too low (e.g., <1% of the total blocks, or a 16 or 32 block threshold, etc.) may place the storage system in safe mode too soon, reducing usability of the host system. When the storage system or aspects thereof exceed the threshold, the storage system can be placed in safe mode, and an indication can be stored in a descriptor that the storage system is in safe mode, selectively retrievable by the host device.

In an example, one or more bits, bytes, or data of a descriptor of a storage system, such as a health or other descriptor of the storage device, can be used to provide the indication. Descriptors are a block or a page of parameters that describe something about the storage system, such as configuration information of the storage system, and can include device descriptors, configuration descriptors, unit descriptors, device health descriptors, etc. Descriptors are generally stored in non-volatile memory, and range between 1 byte to 255 bytes, or in certain examples, more than 255 bytes, with a length value as their first element, representing the entire length of the descriptor including the length byte, and commonly a type identification as their second element. Descriptors can be partially read, with a starting point for read at offset "ooh". Descriptors are generally readable through a Query Request UFS Protocol Information Unit (UPIU) packet, and the device descriptor is provided through a Query Response UPIU. Some descriptors may only be written once. Others include various write protection mechanisms, restricting write access.

Host systems can be configured to read or otherwise receive the provided storage system information in accordance with and identified restricted operation mode. For example, upon a host receiving an indicator that the memory system (or some portion thereof) is in a restricted operation mode, for this example a write-protected mode, the host system can select a boot mode that does not require data be written to the storage system (or the affected portion of the storage system) for operation (e.g., startup, etc.). For example, a host system can be configured with multiple boot modes, including a normal boot mode and a special boot mode configured to recover or record data from the storage system or portion of the storage system in the restricted operation mode, without writing data to the storage system (or the affected portion of the storage system).

FIG. 1 illustrates an example system (e.g., a host system) 100 including a host device 105 (e.g., a UFS host) and a storage system 110 (e.g., a UFS device) configured to communicate over a communication interface (I/F) 115 (e.g., a bidirectional parallel or serial communication interface, such as a UFS interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. The memory controller 111 can optionally include a limited amount of static memory 119 to support operations of the memory controller 111. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115. Control circuitry, as used herein, can refer to one or more of the memory controller 111, the device controller 114, or other periphery circuitry in the storage system 110, the NVM device 112, etc.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, ferro-electric RAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager 125 can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage system 110 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physicalto-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in an optimized manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

FIG. 2 illustrates an example diagram of a descriptor field 200, such as stored by the storage system 110 of FIG. 1. In an example, at offset 02h, a 1-byte field called "bPreE-OLInfo" may indicate pre-EOL (end of life) information for the storage system or aspects of the storage system (e.g., one or more memory devices, dies, LUNs, etc.). The column "MDV" indicates a manufacturer default value, which can be device specific. In FIG. 2, 0h is not defined (or reserved), 1h indicates normal operation, 2h indicates a first warning (such that 80% of the reserved blocks for block replacement have been consumed, etc.), 3h indicates a second warning (such that 90% of the reserved blocks for block replacement have been consumed, etc.), and others are reserved.

The descriptor field 200 may be changed to provide an indication that the system (or a specific component of the system, such as one or more of the memory devices, etc.) is in a safe mode or not in a safe mode, or in certain examples, one of multiple modes (e.g., one of multiple safe modes, etc.). For example, one or more additional bits can be added, and in certain examples one or more bytes, to that currently illustrated in the descriptor field 200, at least one being an indication that the storage system or aspects thereof are in a safe mode, not in a safe mode, or in one of multiple modes (e.g., including one of multiple safe modes). In other examples, one of the separate first and second warnings can be omitted and replaced with a safe mode indication.

For example, 4h can indicate that EOL of one or more aspects of the storage system or has been reached, 5h can indicate that one or more aspects of the storage system are in a permanent write protect mode (PERM WRITE PROT), and 6h can indicate that one or more aspects of the storage system are in a temporary write protect mode (TEMP WRITE PROT). In other examples, one or more other indications can indicate safe mode (or write protect mode, etc.) operation. In other examples, the normal operation indication can be omitted and replaced (e.g., at 1h or elsewhere) with the safe mode indication. A "0" written to the bit can indicate one condition (e.g., non-safe-mode or normal operation, etc.), and a "1" can indicate another (e.g., safe mode). In other examples, one or more other bits, bytes, or descriptors can be changed or added to provide the safe mode indication.

Each descriptor in a storage system has an index number associated with it. The index value starts at zero and increments by one for each additional instantiated descriptor. For example, if there is only one device descriptor in the storage system, the single device descriptor has an index value of zero. The first string descriptor will have an index of zero. The Nth string descriptor will have an index value of N-1. Descriptors are accessed by requesting a descriptor IDN and a descriptor index. For example, to request the fifth unit descriptor, the request would reference the TYPE unit (e.g., value=3, if the unit descriptor is the third descriptor type) and index value (e.g., for the fifth unit descriptor, index value=4 (5-1=4)). Configuration descriptors generally allow modification of the device configuration set by a manufacturer. Parameter settings in the configuration descriptors are used to calculate and populate parameter field s in the device descriptor and unit descriptors, an internal operation by the storage system. Depending on the value of a lock attribute (e.g., if a lock attribute is set or equal to zero), the storage system may write one or more values at will.

To read a descriptor, a query request operation, READ DESCRIPTOR opcode can be sent by the host device to the storage system. The host device can build a QUERY REQUEST UPIU and place a READ DESCRIPTOR opcode in the UPIU and set the appropriate values in the required fields to read the desired descriptor. Upon receipt, the storage system can retrieve the descriptor indicated and return data to the host in a QUERY RESPONSE UPIU, placing the descriptor in a data segment area of the response.

Device health descriptors provide information related to the health of the storage system, or one or more components of the storage system. In certain examples, the storage system can include a memory controller and a number of memory devices (e.g., a number of arrays, dies, LUNs, memory devices, etc.), and each memory device can include a device controller. In certain examples, each memory device can include a set of descriptors including parameters for each memory device, and in certain examples, the storage system. The storage system can include a set of system descriptors for the storage system, in certain examples, including information about the separate memory devices. Thus, in an example, the descriptor field 200 may be specific to a specific memory device of the storage system.

The storage system, or the memory device, can be configured to update the descriptors during operation. Safe mode, including a write protect mode, etc., can be activated on the storage system or one or more of the memory devices of the storage system during operation. If one or more operations fail, the host device can be configured to read the descriptors to determine the reason for the one or more failures.

In an example, when booting (starting, restarting, or initializing) a host system, a host system can be configured to read one or more storage system descriptors, such as at a specific offset, bytes, bits, etc., to determine parameters of the storage system prior to writing data to the storage system. If the storage system or one or more other storage system or other components or devices are not in safe mode, then normal boot mode operation can continue, including one or more writes to the storage system. If the storage system or one or more other storage system or other components or devices are in safe mode, then a modified boot mode can be pursued where, in certain examples, writes to the storage system are not required. Further, in such examples, data can be recovered or read from the storage system, such as with one or more read commands.

In other examples, one or more flags, data units, or other values with read and write access can be used to provide an indication that the storage system (or aspects of the storage system, such as one or more of the memory devices, etc.) is in a safe mode or not in a safe mode, or in certain examples, one of multiple modes (e.g., one of multiple safe modes, etc.).

Figure 3:
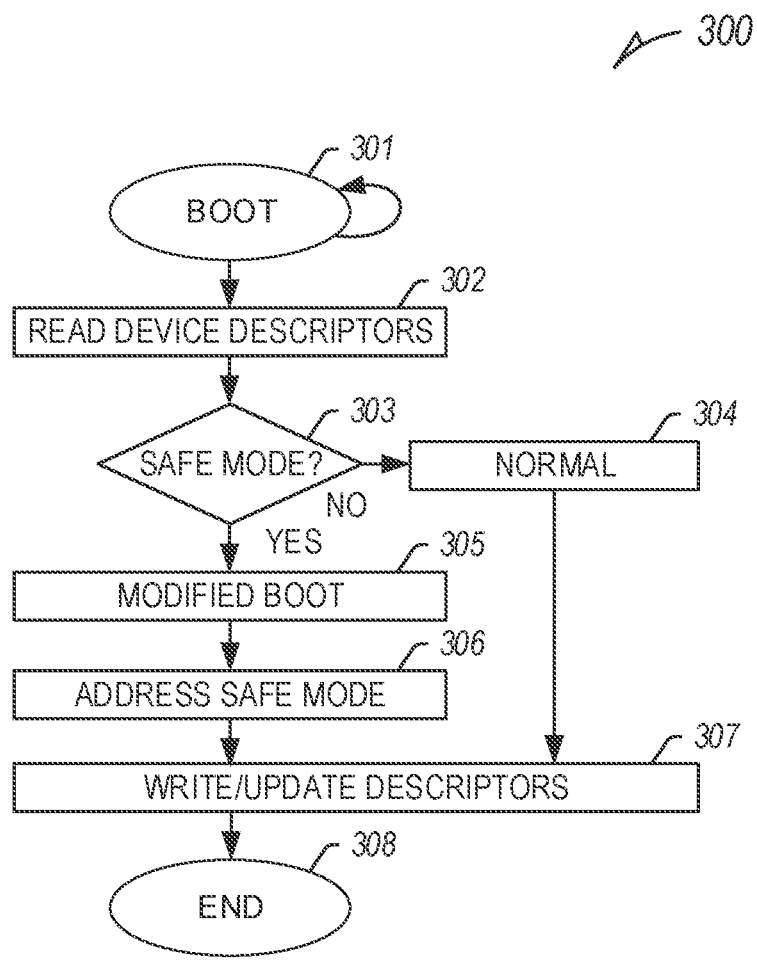
FIG. 3 illustrates an example method of safe mode operation.

FIG. 3 illustrates an example method of safe mode operation 300 in a host system including a host device (e.g., a UFS host) and a storage system (e.g., a UFS device) coupled via a communication interface (e.g., a UFS interface).

At 301, the host system can boot, such as at startup, restart, reset, etc. There can be several boot modes, in certain examples including a normal boot mode, a safe boot mode, or one or more other modified boot modes. The boot modes can include a first boot mode (e.g., normal boot mode) that requires data to be written by the host device to the storage system during boot, and a second boot mode that does not (e.g., a modified boot mode).

At 302, device descriptors, such as stored in or of the storage system or aspects thereof, can be read, such as by the host device. If a normal boot mode fails, the host system can attempt to reboot. In an example, after a number of failed boot attempts, the host device can be configured to read device descriptors at 302. In other examples, the host device can be configured to read device descriptors at or during each boot.

At 303, safe mode, or one or more other write protect modes of the storage system or aspects thereof, can be determined, such as using information from the device descriptors. If the storage system or aspects thereof are not in safe mode, then normal operation can continue at 304, including, for example, a normal boot mode, a normal recovery mode, etc. If the storage system or aspects thereof are in safe mode, then the modified boot mode can proceed at 305, without a required write to the storage system.

At 306, safe mode can be addressed. The host device can recover or record data from the storage system or portion of the storage system in safe mode without writing data to the storage system (or the affected portion of the storage system). Data can be recovered, recorded, or moved from the storage system or portion of the storage system, such as to free space on the storage system, or to recover, record, or store data for later use.

At 307, device descriptors can be written or updated, such as to clear the error condition and allow a normal restart after recovery and analysis triggered by the safe mode have been completed, or, if in normal operation at 304 for other purposes. At 308, process can end, such as when the host system or portions thereof are restarted, reset, etc.

Figure 4:
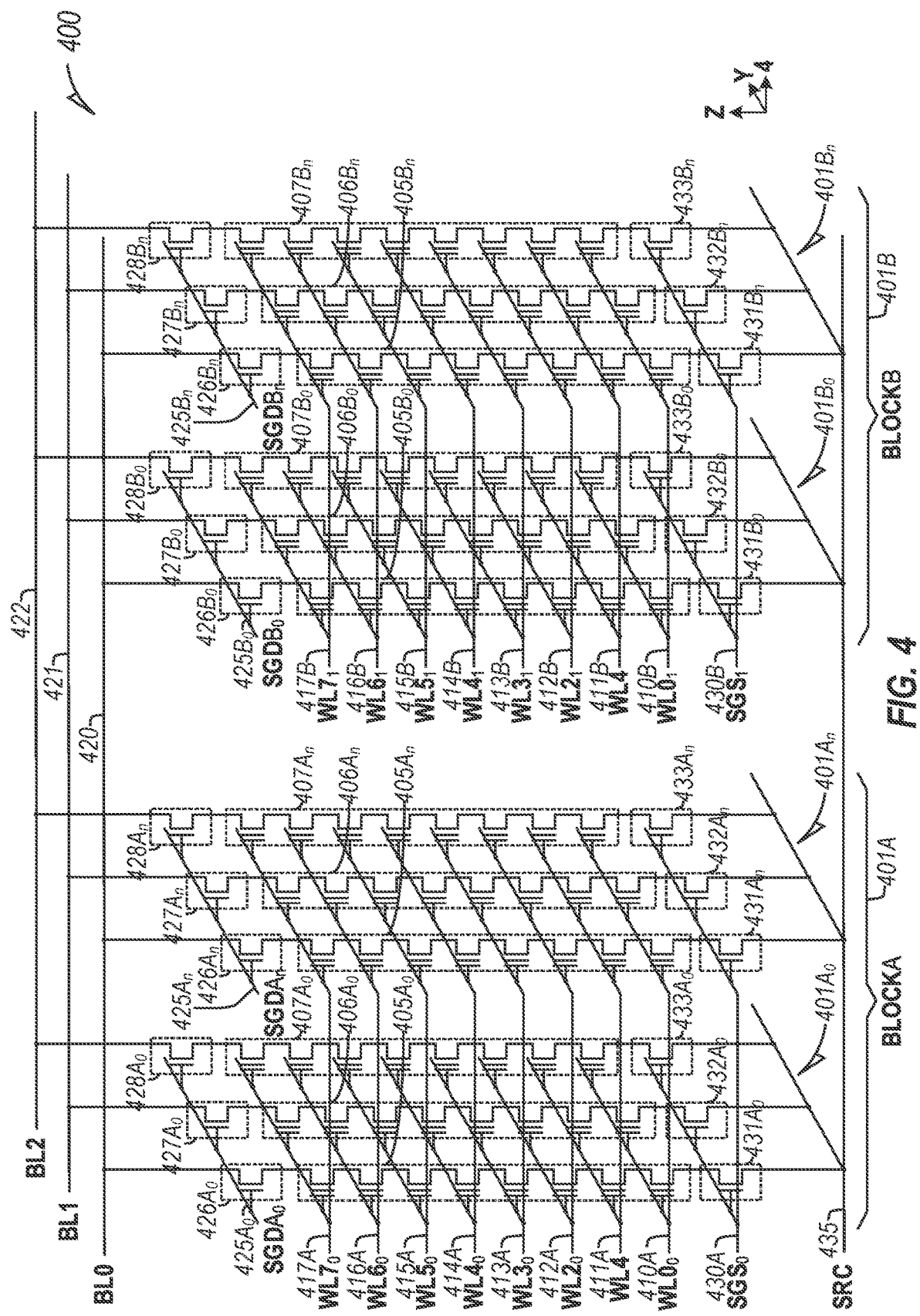
FIG. 4 illustrates an example schematic diagram of a 3D NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ 401$A_0$, sub-block $A_n$ 401$A_n$, sub-block $B_0$ 401$B_0$, sub-block $B_n$ 401$B_n$, etc.). The memory array 400 represents a portion of a greater number of similar structures that would typically be found in a block, device, or other unit of a memory device.

Each string of memory cells includes a number of tiers of storage transistors (e.g., floating gate, replacement gate, charge trapping structures, etc.) stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first-third $B_0$ SGS $431B_0$-$433B_0$, first-third $B_n$ SGS $431B_n$-$433B_n$, etc.) and a drain-side select gate (SGD) (e.g., first-third $A_0$ SGD $426A_0$-$428A_0$, first-third $A_n$ SGD $426A_n$-$428A_n$, first-third $B_0$ SGD $426B_0$-$428B_0$, first-third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 400 includes a control gate (CG) coupled to (e.g., electrically or otherwise operatively connected to) an access line (e.g., word lines (WL) WL0$_0$-WL7$_0$ 410A-417A, WL0$_1$-WL7$_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $426A_0$-$428A_0$ can be accessed using an $A_0$ SGD line $SGDA_0$ $425A_0$, first-third $A_n$ SGD $426A_n$-$428A_n$ can be accessed using an $A_n$ SGD line $SGDA_n$ $425A_m$, first-third $B_0$ SGD $426B_0$-$428B_0$ can be accessed using a $B_0$ SGD line $SGDB_0$ $425B_0$, and first-third $B_n$ SGD $426B_n$-$428B_n$ can be accessed using a $B_n$ SGD line $SGDB_n$ $425B_n$. First-third $A_0$ SGS $431A_0$-$433A_0$ and first-third $A_n$ SGS $431A_n$-$433A_n$ can be accessed using a gate select line $SGS_0$ 430A, and first-third $B_0$ SGS $431B_0$-$433B_0$ and first-third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
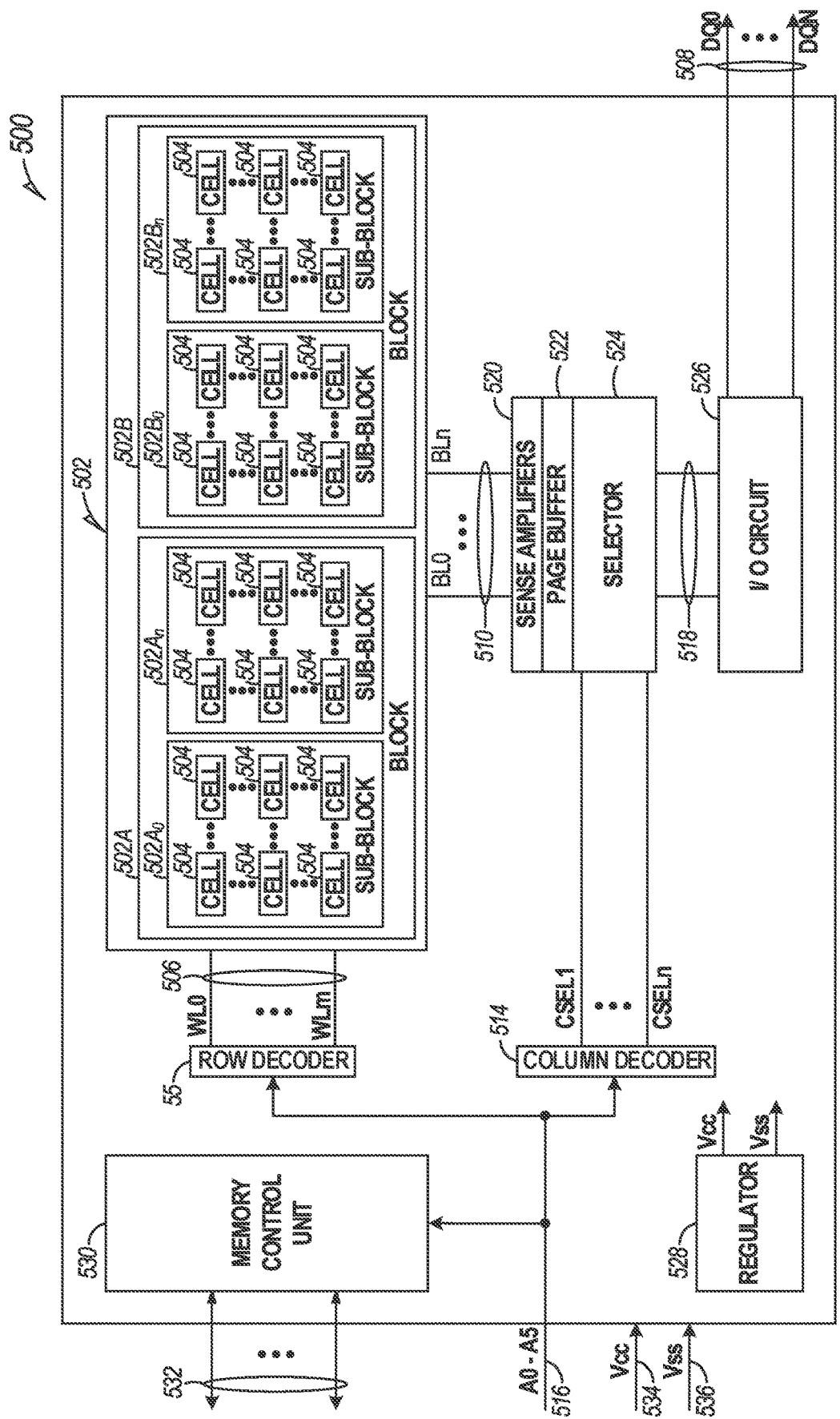
FIG. 5 illustrates an example block diagram of a memory module.

FIG. 5 illustrates an example block diagram of a memory device 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the memory device 500 can represent a block diagram of circuits and components for each die or LUN. The memory device 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include sub-blocks. For example, the first block 502A can include first and second sub-blocks 502A₀, 502A_m, and the second block 502B can include first and second sub-blocks $502B_0$, $502B_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the memory device 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the memory device 500 can control the values of the control signals on the control lines 532, or the address signals on the address line 516. Examples of devices external to the memory device 500 can include, but are not limited to, a host, a memory controller, a processor, or one or more circuits or components not illustrated in FIG. 5.

The memory device 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The memory device 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the memory device 500 can communicate with the memory device 500 using the I/O lines (DQ0-DQN) 508, address lines 516 (A0-AX), or control lines 532. The input/output (I/O) circuit 526 can transfer values of data in or out of the memory device 500, such as in or out of the page buffer 522 or the memory array 502, using the I/O lines 508, according to, for example, the control lines 532 and address lines 516. The page buffer 522 can store data received from the one or more devices external to the memory device 500 before the data is programmed into relevant portions of the memory array 502, or can store data read from the memory array 502 before the data is transmitted to the one or more devices external to the memory device 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
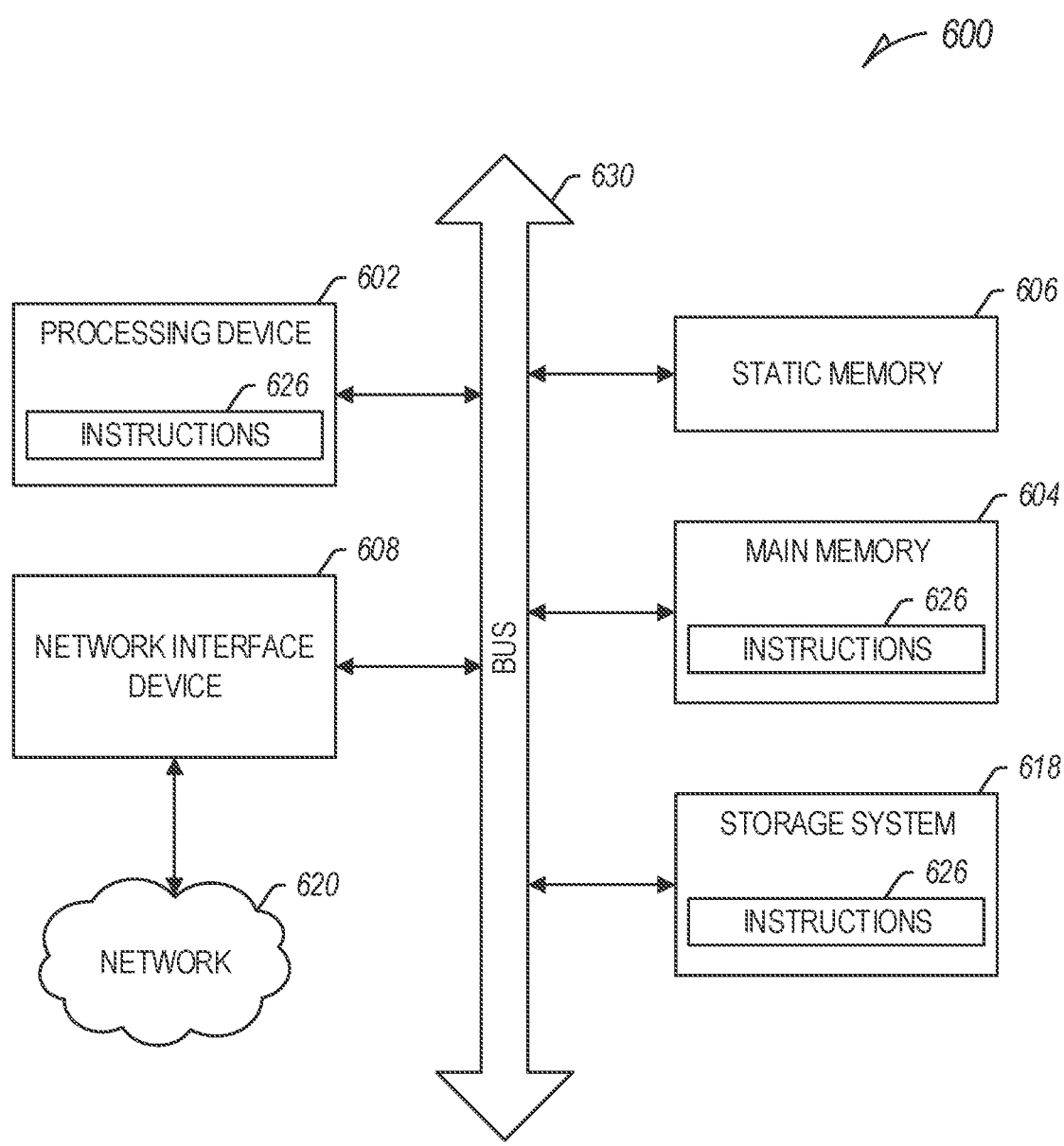
FIG. 6 illustrates an example block diagram of an information handling system.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 is a system comprising: a group of non-volatile memory cells; and control circuitry, coupled to the group of non-volatile memory cells, the control circuitry configured to: receive, from a host device over a communication interface, a request for a descriptor of the storage system; and send to the host device, over the communication interface, the descriptor, the descriptor comprising an indication that a component of the storage device is in a restricted-operation mode.

In Example 2, the subject matter of Example 1 optionally includes wherein the descriptor comprises a first field to indicate that the storage device is in the restricted-operation mode.

In Example 3, the subject matter of any one or more of Examples 1-2 optionally include wherein the restricted-operation mode comprises a safe mode.

In Example 4, the subject matter of any one or more of Examples 1-3 optionally include wherein the descriptor comprises a device health descriptor comprises pre-end-of-life information of the storage system, comprising: a warning field to indicate that the number of replacement blocks exceeds a warning threshold; and a restricted-operation-mode field to indicate that the storage device is in the restricted-operation mode.

In Example 5, the subject matter of any one or more of Examples 1-4 optionally include wherein the descriptor comprises a device health descriptor comprises pre-end-of-life information of the storage system, comprising: a first warning field to indicate that the number of replacement blocks exceeds a first threshold; a second warning field to indicate that the number of replacement blocks exceeds a second threshold higher than the first threshold; and a restricted-operation-mode field to indicate that the storage device is in the restricted-operation mode, wherein the restricted-operation mode includes a write-protect mode.

In Example 6, the subject matter of any one or more of Examples 1-5 optionally include wherein the control circuitry is configured to: determine if the storage system is in the restricted-operation mode; and write the indication that the component of the storage system is in the restricted-operation mode using the determined restricted-operation mode.

In Example 7, the subject matter of Example 6 optionally includes wherein the storage device comprises multiple memory devices, each of the multiple memory devices including a device controller, wherein the control circuitry includes a memory device of the storage system or a device controller of a memory device, and wherein the storage system is configured to determine if the number of replacement blocks meets a replacement threshold.

In Example 8, the subject matter of any one or more of Examples 1-7 optionally include the host device, wherein the host device is configured to utilize the indication to determine a boot mode of the host device.

Example 9 is a method implemented by control circuitry of a storage system, the method comprising: receiving, from a host device over a communication interface, a request for a descriptor of the storage system; and sending to the host, over the communication interface, the descriptor, the descriptor comprising an indication that a component of the storage device is in a restricted-operation mode.

In Example 10, the subject matter of Example 9 optionally includes wherein the descriptor comprises a first field to indicate that the storage device is in the restricted-operation mode.

In Example 11, the subject matter of any one or more of Examples 9-10 optionally include wherein the restricted-operation mode comprises a safe mode.

In Example 12, the subject matter of any one or more of Examples 9-11 optionally include wherein the descriptor comprises a device health descriptor comprises pre-end-of-life information of the storage system, comprising: a warning field to indicate that the number of replacement blocks exceeds a warning threshold; and a restricted-operation-mode field to indicate that the storage device is in the restricted-operation mode.

In Example 13, the subject matter of any one or more of Examples 9-12 optionally include wherein the descriptor comprises a device health descriptor comprises pre-end-of-life information of the storage system, comprising: a first warning field to indicate that the number of replacement blocks exceeds a first threshold; a second warning field to indicate that the number of replacement blocks exceeds a second threshold higher than the first threshold; and a safe-mode field to indicate that the storage device is in the restricted-operation mode, wherein the restricted-operation mode includes a write protect mode.

In Example 14, the subject matter of any one or more of Examples 9-13 optionally include determining if the storage system is in the restricted-operation mode; and writing the indication that the component of the storage system is in the restricted-operation mode using the determination.

In Example 15, the subject matter of Example 14 optionally includes wherein the storage device comprises multiple memory devices, each of the multiple memory devices including a device controller, wherein the control circuitry includes a memory device of the storage system or a device controller of a memory device, and wherein determining if the storage system is in the restricted-operation mode includes determining if the number of replacement blocks meets a replacement threshold.

In Example 16, the subject matter of any one or more of Examples 12-15 optionally include wherein the host device utilizes the indication to determine a boot mode of the host device.

Example 17 is a machine-readable medium, storing instructions, which when executed by a storage system, cause the storage system to perform operations comprising: receiving, from a host device over a communication interface, a request for a descriptor of the storage system; and sending to the host, over the communication interface, the descriptor, the descriptor comprising an indication that a component of the storage device is in a restricted-operation mode.

In Example 18, the subject matter of Example 17 optionally includes wherein the descriptor comprises a first field to indicate that the storage device is in the restricted-operation mode, wherein the restricted-operation mode comprises a safe mode.

In Example 19, the subject matter of any one or more of Examples 17-18 optionally include wherein the restricted-operation mode comprises a safe mode.

In Example 20, the subject matter of any one or more of Examples 17-19 optionally include wherein the descriptor comprises a device health descriptor comprises pre-end-of-life information of the storage system, comprising: a warning field to indicate that the number of replacement blocks exceeds a warning threshold; and a restricted-operation-mode field to indicate that the storage device is in the restricted-operation mode.

Example 21 is a system comprising: means for receiving, from a host device over a communication interface, a request for a descriptor of the storage system; and means for sending to the host, over the communication interface, the descriptor, the descriptor comprising an indication that a component of the storage device is in a restricted-operation mode, wherein the host device utilizes the indication to determine a boot mode of the host device.

Example 22 is a system comprising: a host device comprising a host processor and a group of volatile memory cells; and wherein the host processor is configured to: send, to a storage system over a communication interface, a request for a descriptor of the storage system; receive from the storage system, over the communication interface, the descriptor, the descriptor comprising an indication that a component of the storage device is in a restricted-operation mode; and determining a boot mode of the host device using the received indication.

Example 23 is a method implemented by a host processor of a host device, the method comprising: sending, to a storage system over a communication interface, a request for a descriptor of the storage system; receiving from the storage system, over the communication interface, the descriptor, the descriptor comprising an indication that a component of the storage device is in a restricted-operation mode; and determining a boot mode of the host device using the received indication.

Example 24 is a machine-readable medium, storing instructions, which when executed by a host processor of a host device, cause the host processor to perform operations comprising: sending, to a storage system over a communication interface, a request for a descriptor of the storage system; receiving from the storage system, over the communication interface, the descriptor, the descriptor comprising an indication that a component of the storage device is in a restricted-operation mode; and determining a boot mode of the host device using the received indication.

In Example 25, subject matter (e.g., a system or apparatus) may optionally combine any portion or combination of any portion of any one or more of Examples 1-24 to comprise "means for" performing any portion of any one or more of the functions or methods of Examples 1-24, or at least one "non-transitory machine-readable medium" including instructions that, when performed by a machine, cause the machine to perform any portion of any one or more of the functions or methods of Examples 1-24.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a storage system comprising a group of non-volatile memory cells and control circuitry coupled to the group of non-volatile memory cells, the control circuitry configured to:
   provide, to a host device over a communication interface, a descriptor of the storage system comprising an indication of an operation mode of a component of the storage system, the operation mode selected from one of a plurality of available operation modes, comprising:
   a normal-operation mode indicative that the host device boot in a normal boot mode and that the number of replacement blocks does not exceed a warning threshold; and
   a restricted-operation mode indicative that the storage system is in a restricted-operation mode and that the host device boot in a modified boot mode to prevent host device boot failure.

2. The system of claim 1, wherein the plurality of available operation modes further comprises:
   a warning mode indicative that the host device boot in the normal boot mode and that the number of replacement blocks exceeds the warning threshold.

3. The system of claim 2, wherein the warning mode comprises:
   a first warning field to indicate that the number of replacement blocks exceeds a first threshold; and
   a second warning field to indicate that the number of replacement blocks exceeds a second threshold higher than the first threshold, and
   wherein the restricted-operation mode includes a write-protect mode.

4. The system of claim 2, wherein the control circuitry is configured to receive, from the host device over the communication interface a request for the descriptor of the storage system, the request associated with host device boot and separate from a write request from the host device to the storage system, and
   wherein, to provide the descriptor to the host device, the control circuitry is configured to send to the host device, over the communication interface and in response to the received request for the descriptor, the descriptor of the storage system.

5. The system of claim 1, wherein the descriptor comprises a first field to indicate that the storage system is in the restricted-operation mode.

6. The system of claim 1, wherein the restricted-operation mode comprises a safe mode.

7. The system of claim 1, wherein the storage system comprises multiple memory devices, each of the multiple memory devices including a device controller,
wherein the control circuitry includes a memory device of the storage system or a device controller of a memory device,
wherein the descriptor of the storage system comprises a descriptor of the storage system associated with host device boot, and
wherein the storage system is configured to determine if the number of replacement blocks meets a replacement threshold.

8. The system of claim 1, comprising:
the host device,
wherein the host device is configured to utilize the indication to determine one of the normal boot mode of the host device that requires data to be written to the storage system to complete host device boot or the modified boot mode the host device that does not require data to be written to the storage system to complete host device boot.

9. A system comprising:
a host device comprising a host processor and a group of volatile memory cells, wherein the host processor is configured to:
receive, over a communication interface, a descriptor of a storage system comprising an indication of an operation mode of a component of the storage system, the operation mode selected from one of a plurality of available operation modes, comprising:
a normal-operation mode indicative that the host device boot in a normal boot mode and that the number of replacement blocks does not exceed a warning threshold; and
a restricted-operation mode indicative that the storage system is in a restricted-operation mode and that the host device boot in a modified boot mode to prevent host device boot failure,
wherein the host processor is configured to select a host device boot mode using the received descriptor.

10. The system of claim 9, wherein the boot mode is selected from one of a normal boot mode comprising writing data to the storage system during boot and a modified boot mode without writing data to the storage system during boot.

11. The system of claim 10, wherein the modified boot mode comprises a safe boot mode.

12. The system of claim 9, wherein the host processor is further configured to:
provide a request for the descriptor of the storage system over the communication interface; and
receive the descriptor from the storage system during host device boot.

13. The system of claim 9, wherein the host processor is configured to provide the request for the descriptor and receive the descriptor from the storage system after a failed host device boot.

14. The system of claim 9, wherein the host processor is configured to provide the request for the descriptor and receive the descriptor from the storage system after a number of failed host device boot.

15. The system of claim 9, comprising the storage system comprising a group of non-volatile memory cells and control circuitry coupled to the group of non-volatile memory cells, the control circuitry configured to provide, to the host device over the communication interface, the descriptor of the storage system comprising the indication of the operation mode of the component of the storage system,
wherein the descriptor of the storage system comprises a descriptor of the storage system associated with host device boot.

16. A method comprising:
providing, using control circuitry of a storage system comprising a group of non-volatile memory cells, a descriptor of the storage system to a host device over a communication interface, the descriptor of the storage system comprising an indication of an operation mode of a component of the storage system, the operation mode selected from one of a plurality of available operation modes, comprising:
a normal-operation mode indicative that the host device boot in a normal boot mode and that the number of replacement blocks does not exceed a warning threshold; and
a restricted-operation mode indicative that the storage system is in a restricted-operation mode and that the host device boot in a modified boot mode to prevent host device boot failure.

17. The method of claim 16, wherein the plurality of available operation modes further comprises:
a warning mode indicative that the host device boot in the normal boot mode and that the number of replacement blocks exceeds the warning threshold.

18. The method of claim 17, wherein the warning mode comprises:
a first warning field to indicate that the number of replacement blocks exceeds a first threshold; and
a second warning field to indicate that the number of replacement blocks exceeds a second threshold higher than the first threshold, and
wherein the restricted-operation mode includes a write-protect mode.

19. The method of claim 16, comprising:
receiving, using the host device, the descriptor of the storage system over the communication interface; and
selecting, using a host processor of the host device, a boot mode for the host device using the received descriptor, wherein the boot mode is selected from one of a normal boot mode comprising writing data to the storage system during boot and a modified boot mode without writing data to the storage system during boot.

20. The method of claim 19, comprising:
providing, using the host device, a request for the descriptor of the storage system during host device boot.

* * * * *